United States Patent [19]

Van Dyke, Sr. et al.

[11] 4,017,277

[45] Apr. 12, 1977

[54] DIRECT CONTACT WATER HEATING SYSTEM AND PROCESS

[76] Inventors: Bingham H. Van Dyke, Sr., 19 Olde Benchmark Village; Bingham H. Van Dyke, Jr., 127 Roboda Blvd., both of Royersford, Pa. 19468

[22] Filed: Feb. 6, 1975

[21] Appl. No.: 547,698

[52] U.S. Cl. .................................. 55/54; 55/89; 126/350 R; 261/DIG. 9; 432/222
[51] Int. Cl.² .................................. B01D 19/00
[58] Field of Search ............... 202/185 A; 126/355, 126/350 C; 55/89, 54; 261/DIG. 9, 126; 432/222; 210/27, 71, 294

[56] References Cited
UNITED STATES PATENTS

| | | | |
|---|---|---|---|
| 884,223 | 4/1908 | Shipley | 126/355 X |
| 1,527,740 | 2/1925 | Lipshitz | 60/39.56 |
| 2,759,328 | 8/1956 | Cockrell | 60/39.56 |
| 2,921,004 | 1/1960 | Wood | 202/177 |
| 3,204,629 | 9/1965 | Hewton, Jr. | 261/DIG. 9 |
| 3,480,513 | 11/1969 | Martin | 202/185 A |
| 3,635,000 | 1/1972 | Brown | 55/89 |
| 3,733,777 | 5/1973 | Huntington | 261/DIG. 9 |

*Primary Examiner*—Frank A. Spear, Jr.
*Attorney, Agent, or Firm*—Paul & Paul

[57] ABSTRACT

A direct contact water heating system and process are disclosed which provide for the direct contact of hot flue gases with water-to-be-heated without the hot flue gases being washed or quenched prior to their contact with the water in such a manner that maximum thermodynamic efficiency is achieved while delivering water heated to the equilibrium temperature corresponding to the vessel pressure and free of dissolved gases, and requiring, under most conditions, no make-up water. A variation will produce water at a higher temperature. The system discharges scrubbed environmentally-acceptable flue gas to the atmosphere with essentially zero chemical, particulate or thermal pollution.

20 Claims, 1 Drawing Figure

U.S. Patent   April 12, 1977   4,017,277
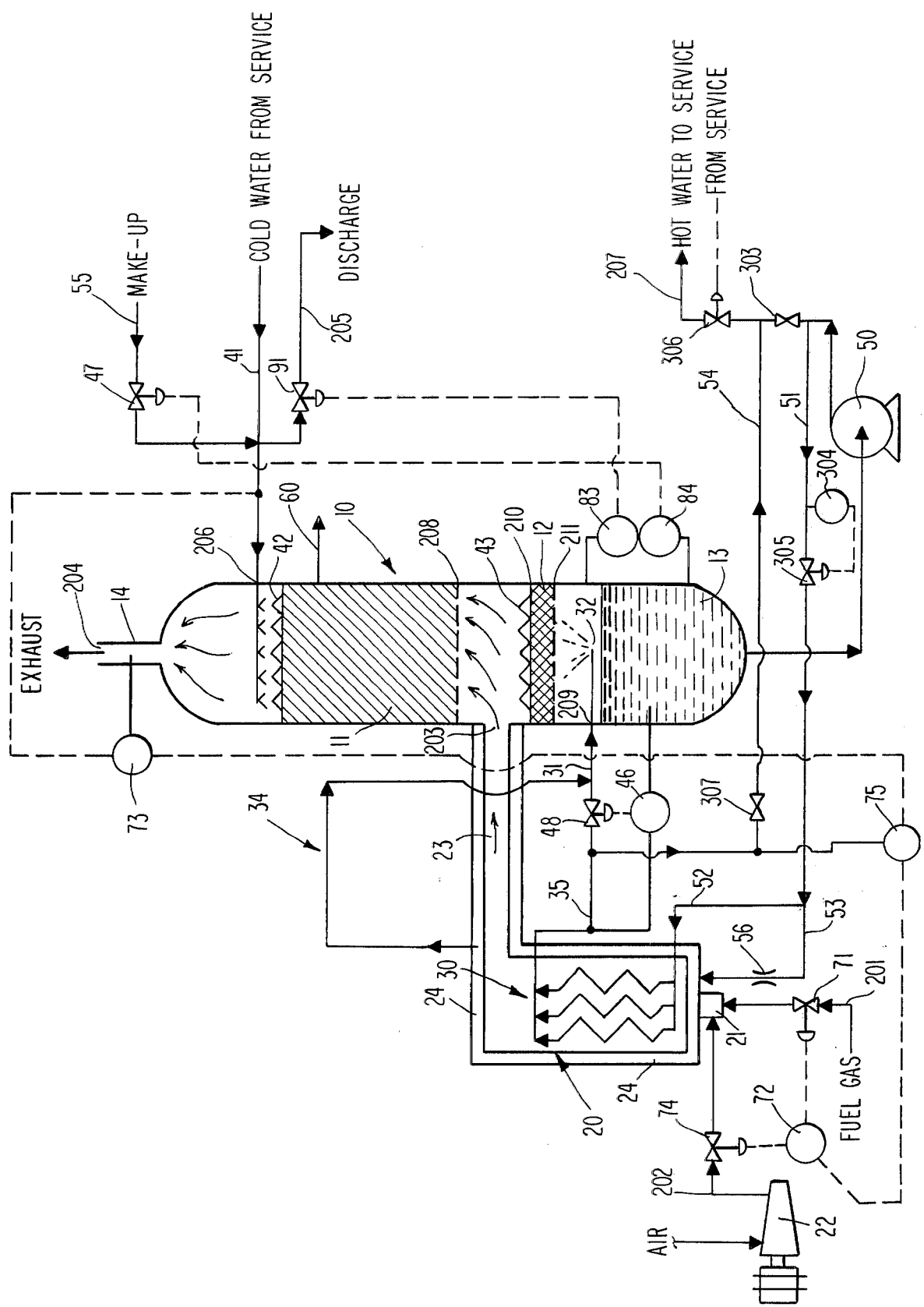

DIRECT CONTACT WATER HEATING SYSTEM AND PROCESS

BACKGROUND OF THE INVENTION

This invention relates to direct contact water heating systems and processes, and more particularly to heating of water by the provision of direct contact of hot flue gases unwashed and unquenched with water-to-be-heated. The means of achieving the higher water temperatures, the means for removal of dissolved gases, and the means for providing make-up water without external source are all combined to achieve maximum thermal efficiency.

As the ready availability of energy resources dwindles, it becomes increasingly necessary to discover ways and means by which available energy resources can be conserved and more efficiently utilized. Especially in the area of industrial and commercial heating of water, as the availability and costs of fuel continues to increase, ways by which the heating of water can be made more thermodynamically and thus economically efficient are much sought after and are of utmost concern to those involved on a day-to-day basis in industry of various types. Previously known water heating devices, such as for instance, as shown in U.S. Pat. Nos. 3,204,629; 2,759,328; 1,527,740; 2,921,004; 3,291,119; 3,423,932; 2,875,749; 1,560,806; and 3,500,817, did not take the best thermodynamic advantage possible of their respective systems; nor did they produce non-corrosive hot water free of dissolved gases.

SUMMARY OF THE INVENTION

Accordingly, it is among the objects of this invention to provide a system and process for taking improved thermodynamic advantage of the available fuel in the heating of water for commercial and industrial use, non-corrosive and free of dissolved gases.

This and other objects of the invention are obtained with a system and process whereby hot, unscrubbed or water-spray-contacted flue gases, at essentially atmospheric pressure, are brought into contact with water-to-be-heated and thereby cooled and exhausted to atmosphere without flow reversal, thus resulting in a more thermodynamically efficient means of transmitting the heat of the flue gases to the water-to-be-heated while concurrently purifying the water by removal of contaminants and making use of the water of combustion to minimize the need for outside make-up water.

Of the indirect contact and direct contact types of water heating, in which there is either indirect or direct contact of the hot combustion products of fuel with the water-to-be-heated, it is generally acknowledged that the direct contact process generally is more thermodynamically efficient. However, the hot flue gases generated during the combustion of fuels contain sulfur dioxide $SO_2$, oxygen, and $CO_2$, which upon contact with water interacts to form highly corrosive compounds. This detrimental effect upon the physical apparatus of water heating systems was alleviated in the past by washing or quenching the hot flue gases with a separate source of circulating water prior to their introduction into direct contact with the water-to-be-heated, thus removing some of the contamination produced during the combustion processes. This procedure, however, does not remove all the corrosion-forming gases since the heating of the quenching water reduces the solubility of the gases, but not sufficiently for total gas removal, and removes a significant portion of the heat of the hot flue gases prior to their coming into contact with the water-to-be-heated, and is thus thermodynamically less efficient. Because of the taken-for-granted presence of these contaminants, however, as a customary and traditional course of action, the necessity for such corrosion-preventative measures was almost universally acknowledged.

In the system and process of the present invention, however, there is direct contact of the hot flue gases generated in the combustion chamber by the burning in air of fuel, with the water-to-be-heated, the hot flue gases previously being unwashed, and unquenched, therefore still retaining essentially all their heat upon entering the contactor chamber, except for a portion which is removed in the cooling of the combustion chamber jacket and/or supplemental indirect surface to produce steam subsequently used in the process, where they rise in counter-current relationship to the water-to-be-heated, which descends over low-pressure-drop packing material or any similar commercially available contactor surface. Water-to-be-heated is distributed over the top surface of the packing of the contactor chamber which comprises packing pellets, trays, or other conventional means to increase the wetted surface and hence, to promote heat and mass transfer between the rising hot flue gases and the descending cold water-to-be-heated. The water percolates downward through the packing by the force of gravity counter-current to the rising flue gases which enter the combined contactor chamber-stripper chamber, beneath the contactor section but above the stripper section. The flue gases are thus cooled to a temperature substantially the same as that of the incoming water-to-be-heated. This close temperature approach results in a high thermal efficiency.

The hot flue gases are generated in a combustion chamber by the direct combustion of fuel and air. This combustion chamber is provided with a circulating water jacket and/or other indirect heat transfer surface to prevent localized overheating of the chamber and flue gas transfer line, to cool the products of combustion prior to entering the contactor chamber, and to provide steam for use in the stripper chamber, all of which heat eventually is transmitted to the water-to-be-heated without loss of efficiency.

The water heated in the contactor chamber is re-distributed over the top of the stripper chamber packing which can be of any form similar to that in the contactor chamber and which is located beneath the point of entrance of the products of combustion from the combustion chamber. The water percolates downward through the stripper packing by the force of gravity counter-current to steam which has been generated in the combustion chamber jacket and/or supplemental indirect heating surface, and admitted beneath the stripper chamber. Without the existance of a stripper section and the passage of steam therethrough, the water-to-be-heated could not be heated in this system to as high a temperature as desired in the contactor section alone, because of the limitation upon maximum temperature due to the partial pressures of the hot flue gases within the contactor section. Heating of the contacted water to boiling in the presence of steam operates to strip out dissolved $CO_2$, $O_2$, and other gases from the water, and to increase the water temperature to essentially the equilibrium temperature of the steam.

The heated gas-free water exiting the stripper chamber is collected in a reservoir, having an atmosphere essentially free of air, oxygen, carbon dioxide, and other soluble gases, from which it is pumped to whatever service for which it is required. The surface of the water is continuously scrubbed with the incoming steam to prevent resolution of contaminants. Should heated water descending into space 32 above the reservoir have any residual gases, the atmosphere of steam in space 32 will cause the remaining gases to separate and join the upward rising steam, such that the reservoir water will be at the temperature of the steam and free of essentially and dissolved gases. The water is essentially of distilled water quality, gas-free, and hence non-corrosive. Some of this water is re-circulated to the combustion chamber jacket and/or supplemental indirect surface for jacket cooling and steam production. The water temperature could be increased above the boiling point by pressurizing and adding extra heat transfer surface through which the water would be circulated prior to being piped to the service for which it is required. In this option steam for the stripper can be provided by flashing some of the superheated water or by using separate heat transfer surface within the combustion chamber.

The gases driven off from the water in the stripper, plus surplus steam, exit the stripper and mix upwardly with the flue gases. If desired, a $CO_2$-rich stream of gas can be removed from the contactor chamber at an intermediate point where the $CO_2$ concentration is near maximum. This type of bleed-off may also be desirable as a means of increasing the performance of the system, and producing a marketable by-product. Some rearrangement of the process components would be required to achieve optimum results.

A variation of the invention would be the substitution of a conventional steam generator proportioned to produce the required amount of steam and/or superheated water to lines 31 and 54 with burners and combustion chamber capable of handling the total fuel requirements of the system. In this variation, duct 23 would convey the stack gases of the boiler to the tower at 203.

Another variation would use steam injected at 32 from an external source, some of which could be exhaust from steam turbines driving blower 22. In this variation the steam producing capability of additional heat transfer surface 30 or jacket 24 would not be required.

Another variation would be to use some of the steam produced in additional heat transfer surface 30 and jacket 24 to operate a steam turbine driver for blower 22, the exhaust steam joining with the steam in line 31.

Another variation would use gas turbine exhaust into chamber 20 instead of burning fuel with air.

BRIEF DESCRIPTION OF THE DRAWING

The FIGURE is a schematic representation of one form of the process and system of the present invention, volume stream flows being shown by solid lines, signals to or from controls being shown by dashed lines, alternative controls being shown by dot-dashed lines, and alternative stream flows by dash-dot, dot lines.

DESCRIPTION OF THE PREFERRED EMBODIMENTS

Referring to the FIGURE, the vertical tower 10 contains contactor chamber 11 near the top, stripper chamber 12 near the middle, and reservoir 13 at the bottom thereof.

Fuel enters combustion chamber 20 through inlet 21, through which also enters air supplied under forced circulation from blower 22. The hot flue gases generated within combustion chamber 20 by the burning of the fuel gas in combustion chamber 20 travels by a duct 23 to entry into vertical tower 10 immediately beneath contactor chamber 11. The hot flue gases rise upward through contactor chamber 11 and then are exhausted to ambient atmosphere through exhaust stack 14 at the top of vertical tower 10.

Combustion chamber 20 and duct 23 are provided with a circulating water jacket 24 which comprises all or a portion of the heat transfer surface required to produce the steam required for the stripper section and to cool the walls of combustion chamber 20 and duct 23. An orifice 56 is supplied in line 53 to assure minimum cooling water flow and a pipe 34 to return the water and some steam to the system via pipe 31.

A variation to provide heat transfer surface to supplement or take the place of the steam producing function of jacket 24 would be the addition of indirect heat transfer surface 30 disposed to heat water and/or to produce some or all of the steam required. This surface is shown on the drawing to be located within the combustion chamber. It may be located in any convenient location to facilitate heat transfer relationship with the hot flue gases and/or to cool the walls of combustion chamber 20. When 30 is designed to produce all of the steam, the jacket 24 could be replaced by refractory or insulation, or via disposition of surface 30. This would eliminate the need for line 53, orifice 56 and line 34.

Steam produced in jacket 24 and/or heat transfer surface 30 is admitted to the vertical tower via transfer lines 34 and 31 to a point below stripper chamber 12 and above liquid level 13 at point 32.

Cold water exiting from the surface in which it is deployed enters vertical tower 10 near the top thereof through supply line 41. The water-to-be-heated is deposited over liquid distributors 42 which distribute the water-to-be-heated evenly and equally over the top of the packing material which comprises contactor chamber 11. After descending through contactor chamber 11 simultaneously with and counter-current to rising hot flue gases which have been generated within combustion chamber 20, the now-heated water encounters liquid distributors 43 which again distributes the water exiting contactor chamber 11 equally over the surface of the packing material which comprises stripper chamber 12. After descending through stripper chamber 12 simultaneously with and counter-current to rising steam supplied beneath stripper chamber 12 at entry point 32 from steam generation means jacket 24 and/or heat transfer surface 30, the now-heated water descends into reservoir 13. From reservoir 13 the contaminant-free heated water at approximately 212° F is pumped by pump 50 back to the service in which it is utilized via valves 303 and 306 and line 207. Some of this water is recirculated through heat transfer surface 30 via line 51, flow control valve 305, and line 52, and/or to the circulating water jacket 24 by lines 51 and 53, and orifice 56, for cooling and steam production. In this variation, valves 303 and 48 are in the open position and controllers 46 and 75 are not operating; valve 307 is closed.

A variation to produce water at a substantially higher temperature than 212° F (or equilibrium temperature at the pressure prevailing at point 32): valve 303 can be closed so that all of the water from pump 50 may be routed via pipe 51 and full open control valve 305. Some of the water as limited by orifice 56 will flow via line 53 to jacket 24 in the variation wherein the jacket is employed. The jacket is cooled and delivers hot water and steam via line 34 to line 31 downstream of control valve 48. The balance will flow through heat transfer 30 via line 52 and leave via line 35 at the desired temperature for which controller 75 is set. Controller 46 and control valve 48 will flash the required amount of this superheated water via line 31 to 32 to provide the balance of the steam required to satisfy the nominal 212° F setting of 46. The balance will flow via valve 307, line 54, control valve 306 and line 207 to service. The temperature is limited to the boiling temperature corresponding to the water pressure.

As an alternate feature a stream 60 of gas rich in $CO_2$ can be removed from above the stripper chamber 12 or otherwise along the contactor chamber 11 wherever its concentration is greatest for purification and marketing.

By means of the direct heat-transfer contact between the hot flue gases and the water-to-be-heated, contactor chamber 11 permits the flue gas generated within combustion chamber 20 to exit the vertical tower 10 through exhaust stack 14 at a temperature very close to the temperature of the incoming cooled water supplied through supply line 41. Since the heat content of the exiting flue gas is the largest portion of possible wasted heat in the unit, this close temperature approach greatly increases the overall thermal efficiency. An exit gas temperature of less than 100° F would yield an efficiency of over 95%. The lower the inlet cool water temperature, the higher the efficiency. The system could have an apparent efficiency greater than 100% should the inlet water temperature be substantially below the ambient air temperature.

The water produced within combustion chamber 20 by the combustion process of the fuel and air, in most cases, will be a greater amount than the water lost from the system with the saturated flue gases exiting through exhaust stack 14. This provides the make-up water for the system; any excess would be discharged via valve 91. In the event all of the hot water going to service is not returned via line 41, additional treated or demineralized make-up water may be provided via line 55 and valve 47. If desired, water from valve 91 can be stored in a surge tank which in turn will supply some or all of the make-up to valve 47.

The primary purpose of contactor chamber 11 is to heat the incoming cooled water stream from service to as high a temperature as possible by direct counter-current contact with hot flue gases emanating from combustion chamber 20. The water cannot be heated to boiling within the contactor chamber because the presence of the hot flue gas effectively reduces the allowable partial pressure of water vapor. The temperature of the descending water within the contactor chamber packing varies between 100°–190° F. Contact within contactor chamber 11 between the exiting flue gas and the descending water-to-be-heated is maximized by providing low pressure drop packing or trays. Liquid distributors 42 and 43 are utilized immediately above contactor chamber 11 and stripper chamber 12 in order to assure proper liquid distribution over the packing.

Stripper section 12 is provided to remove $CO_2$, $O_2$, and other gases dissolved in the descending water within contactor chamber 11 during the contact with the soluble contaminant-rich hot flue gas. Steam generated within steam generation unit 30 within combustion chamber 20 and supplied via supply line 35, control valve 48 and supply line 31, and/or lines 34 and 31, rises from entry point 32 immediately beneath stripper chamber 12 within vertical tower 10 and rises upward through stripper chamber 12 through the packing material counter-current to and simultaneously with the water descending through stripper chamber 12 from contactor chamber 11. The contact of the steam and the water heats the water to the boiling point, thus stripping out any dissolved $CO_2$, $O_2$, and other gases. The quantity of steam normally should be slightly in excess of that theoretically required to heat the water and strip out the dissolved gases.

The air blower 22 must provide sufficient air to combustion chamber 20 to allow combustion at a pressure sufficient to overcome the combustion chamber and contactor chamber pressure drops. The contactor chamber pressure drop will depend upon the depth and type of packing provided and the superficial gas velocity. It is contemplated that blower 22 would probably be driven by an electric motor although a turbine or gas engine could probably also be be utilized. In one variation, steam for the turbine may be generated by heat transfer surface in the combustion chamber 24. The turbine exhaust steam may be admitted to point 32 to supplement the requirements at this point.

The system is controlled by controlling the amount of input fuel and air through inlet 21. The fuel-air ratio and burner safety controls are of conventional boiler control variety as indicated by 72 on the FIGURE. Valve 71 controls the fuel and valve 74 controls the air in correct ratio for efficient combustion. The amount of fuel burned at any instant is as required to meet the needs of the system. One way to accomplish this while maintaining maximum efficiency is for controller 73 to monitor the temperature of the incoming cold water in line 41 and the outgoing flue gas leaving through stack 14. Controller 73 is set to maintain the stack gas temperature slightly above the cold water inlet temperature. If the stack gas temperature exceeds the set differential, controller 73 reduces the amount of fuel. If the stack gas temperature is below the set differential, controller 73 would increase the fuel. In the variation where the water is heated to a temperature substantially higher than the boiling temperature corresponding to the pressure at point 32 (nominal 212° F at one Atmosphere), controller 73 will work in conjunction with controller 75 to control the combustion via 72 as required to heat the water to the desired temperature while maintaining the exit flue gas temperature at minimum approach to the cold water return temperature to achieve maximum thermal efficiency. The temperature of the water entering reservoir 13 is controlled by the amount of steam entering at point 32 via valve 48 and line 31. In the high temperature variation, controller 46 monitors the temperature of the water in the reservoir 13 and opens or closes valve 48 to maintain a pre-set temperature in the range of 212° F to 220° F, the object being to achieve equilibrium temperature corresponding to the steam pressure at point 32. A fixed orifice 56 will assure a minimum flow of water through jacket 24 to prevent excessive temperature, the excess being conveyed to line 31 and point 32 via line 34. An override monitor to controller 46 will assure minimum flow of water through heat transfer surface 30 to prevent overheating of this surface via valve 48 and line 31 to point 32.

A high level controller 83 operates a discharge valve 91 to remove excess water from the system via line 205. This may go to a holding reservoir or to waste. A low level controller 84 operates a make-up valve 47 via line 55 which admits make-up water to the system to replace any deficiency. This may come from a storage reservoir or other source; preferably distilled water.

Table 1 shows theoretical design stream data at various points within the entire system for one particular embodiment.

It will be apparent from the above disclosure that various other modifications may be made in the details of construction, use, and operation of the invention, and yet still be within the spirit and scope of the present invention as defined in the following claims.

4. A process according to claim 3, wherein heated water is provided at a plurality of temperatures.

5. A process according to claim 1, wherein said water-to-be-heated is drawn through the contactor chamber and the stripper chamber by the force of gravity.

6. A process according to claim 1, wherein the hot flue gases immediately prior to their exhaustion to ambient atmosphere have been reduced in temperature in the contactor chamber to a temperature substantially the same as that of the water-to-be-heated entering the contactor chamber.

7. A process according to claim 1, further comprising the step of extracting a $CO_2$-rich stream of gas and steam from the contactor chamber at the point of maximum $CO_2$ concentration in gas phase, prior to their exhaustion to ambient atmosphere.

8. A closed cycle system for heating water comprising:
   a. a source of hot flue gases;

TABLE I

| | DIRECT CONTACT WATER HEATER PROCESS DESIGN STREAM DATA | | | | | | | | | | |
|---|---|---|---|---|---|---|---|---|---|---|---|
| | | | | | Stream Points | | | | | | |
| Lbs/Hr | 201 | 202 | 203 | 204 | 205 | 206 | 207 | 208 | 209 | 210 | 211 |
| $CO_2$ | | | 12,100 | 12,100 | | | | | | 910 | |
| $N_2$ | | 64,300 | 64,300 | 64,300 | | | | | | | |
| $O_2$ | | 19,300 | 1,800 | 1,800 | | | | | | | |
| $CH_4$ | 4400 | | | | | | | | | | |
| $H_2O$ (Gas) | | 1,000 | 10,800 | 4,700 | | | | | 20,400 | 700 | |
| $H_2O$ (Liquid) | | | | | 6,100 | 885,900 | 892,000 | 886,600 | Variable | | 911,700 |
| T, °F | 60 | 32–75 | 2680 | 101 | 100 | 100 | 212 | 191 | 214 | | 212 |

Basis Methane Fuel, 100 × 10⁶ BTU/Hr Process Duty

What is claimed is:

1. An unpressurized process for heating water, comprising the steps of:
   burning fuel in air in a combustion chamber, thus generating hot flue gases;
   passing without flow-reversal the hot flue gases unquenched and unwashed through a contactor chamber and then exhausting the flue gases to ambient atmosphere;
   passing water-to-be-heated through the contactor chamber simultaneously with, and counter-current to, the hot flue gases, such that there is heat and mass transfer relationship between the hot flue gases and the water-to-be-heated;
   passing the water which has passed through the contactor chamber through a stripper chamber; and
   passing steam through the stripper chamber simultaneously with, and counter-current to, the water which has passed through the stripper chamber, such that there is heat and mass transfer relationship between the water and the steam, thereby stripping out dissolved gases such as $CO_2$ and $O_2$ from the heated water, and thereby also increasing the temperature of the water.

2. A process according to claim 1, wherein the steam passed through the stripper chamber is produced by steam generation means within the combustion chamber simultaneously with the generation of the hot flue gases.

3. A process according to claim 2, further comprising the step of passing water which has exited from the stripper chamber through the steam generation means, thereby raising the temperature of the water about 212° F, said steam generation means being an indirect heat transfer surface.

b. an integral, generally vertical water heating vessel defining, from top to bottom, a gas exhaust zone, a cold water inlet, a contactor zone for counter-current passage of and heat exchange between water and flue gas, a flue gas introduction zone, a stripper zone, a steam inlet zone, and a hot water reservoir opening directly into said steam inlet zone;
   c. means for introducing said hot flue gases in an unwashed, unquenched state into said gas introduction zone to rise through said contactor zone;
   d. means for introducing water to be cooled to said water inlet for passage downwardly through said contactor zone, simultaneously and counter-current with said flue gases, for direct heat and mass transfer relationship between gases and water and bringing said water to a first predetermined temperature level;
   e. means for coupling steam to said steam inlet zone for upward passage through said stripper zone, for stripping of dissolved gases from water passing down from said contactor zone into and through said stripper zone, and for direct heat and mass transfer relationship heat exchange between steam and water, thereby further heating the water from said first temperature to a designated final temperature at said reservoir;
   f. wherein cold water introduced at the top of said vessel cascades downwardly through the successive zones under the influence of gravity, receiving successive temperature increases and reaching said reservoir in a fully heated condition.

9. A system as described in claim 8, wherein said source of gases comprises a combustion chamber for burning fuel in air, thus generating hot flue gases.

10. A system according to claim 9, further comprising a steam generation unit within said combustion chamber from which is supplied the steam utilized in said stripper zone.

11. A system according to claim 9, further comprising a circulating water jacket surrounding said combustion chamber and a transfer line adapted to provide additional steam for said stripper zone and to prevent overheating of the walls of said combustion chamber and transfer line.

12. A system according to claim 11, further comprising
- a steam turbine;
- said steam turbine being operated with steam supplied by said steam generation unit and said circulating water jacket;
- said steam turbine driving blower means supplying air to said combustion zone;
- exhaust gases from said steam turbine being admitted to said stripper zone.

13. A system according to claim 9, wherein said contactor zone and said stripper zone comprise low-pressure-drop packing material to provide an efficient environment for heat and mass transfer between the gas and liquid phases.

14. A system according to claim 13, wherein said contactor zone and said stripper zone include therein liquid distributor means which distribute incoming water equally over the surface of the packing.

15. A system according to claim 9, wherein steam utilized in said stripper zone is supplied from a source external to said system.

16. A system according to claim 15, further comprising
- a steam turbine;
- said steam turbine driving blower means supplying air utilized in said combustion chamber;
- said steam turbine also supplying at least part of said external source of steam.

17. A system according to claim 9, wherein steam utilized in said stripper zone is supplied from a conventional steam generator.

18. A system according to claim 17, wherein exhaust gases from a conventional steam generator are admitted to said contactor zones.

19. A system according to claim 9, wherein hot flue gases are supplied from a conventional steam generator.

20. A system for heating water, comprising:
- a source of hot flue gases;
- a contactor chamber, connected to said combustion chamber to which hot flue gases are admitted, unwashed and unquenched;
- said contactor chamber adapted for the passage therethrough of water-to-be-heated simultaneously with, and counter-current to, the hot flue gases, said contactor chamber also adapted such that there is direct heat and mass transfer relationship between the hot flue gases and the water-to-be-heated;
- a stripper chamber, connected to said contactor chamber, adapted for the passage therethrough of water which has exited from said contactor chamber, said stripper chamber also adapted for the passage therethrough of steam simultaneously with, and counter-current to, the water exiting from said contactor chamber, said stripper chamber adapted such that there is direct heat and mass transfer relationship between the steam and the water, so that the water is stripped of dissolved gases, and is further heated; and
- a reservoir in which water exiting from said stripper chamber is collected and retained prior to being pumped to whatever service for which it is required, the surface of the reservoir water being in direct contact with steam to maintain the temperature and prevent resolution of contaminants, wherein said source of hot flue gases is the exhaust form a gas turbine.

* * * * *

UNITED STATES PATENT OFFICE
CERTIFICATE OF CORRECTION

Patent No. 4,017,277            Dated April 12, 1977

Inventor(s) Bingham H. Van Dyke, Sr., et al.

It is certified that error appears in the above-identified patent and that said Letters Patent are hereby corrected as shown below:

Column 7, line 66, "about" should be --above--.

Signed and Sealed this ninth Day of August 1977

[SEAL]

Attest:

RUTH C. MASON
*Attesting Officer*

C. MARSHALL DANN
*Commissioner of Patents and Trademarks*